April 4, 1950        T. M. BERRY        2,503,023
PHOTOELECTRIC MOTION TRANSMITTING DEVICE
Filed Oct. 21, 1947
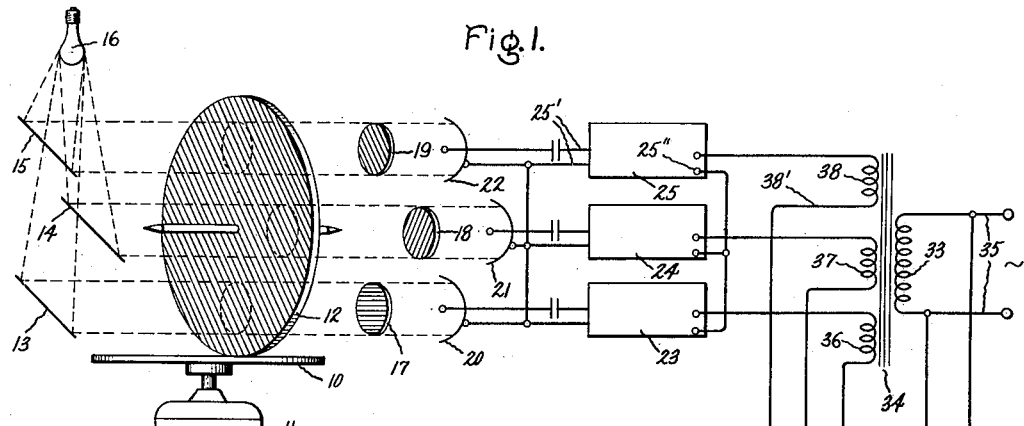
Fig.1.
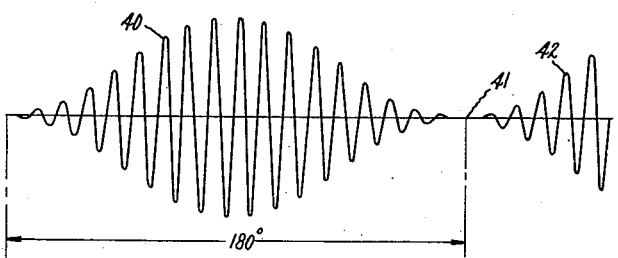
Fig.2.
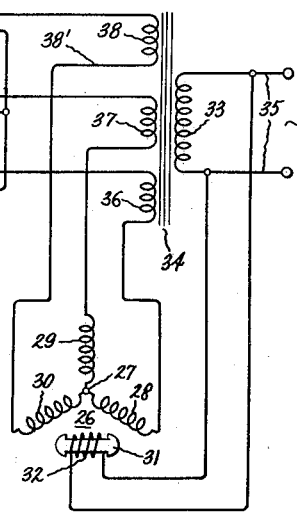
Fig.3.
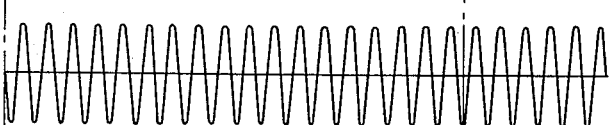
Fig.5.
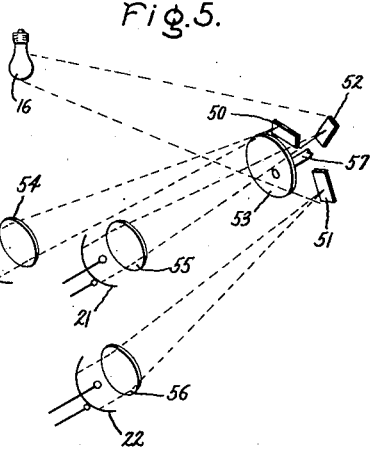
Fig.4.
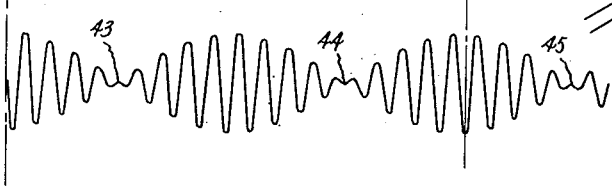
Inventor:
Theodore M. Berry,
by *Prowell S. Mack*
His Attorney.

Patented Apr. 4, 1950

2,503,023

UNITED STATES PATENT OFFICE 2,503,023

PHOTOELECTRIC MOTION TRANSMITTING DEVICE

Theodore M. Berry, Schenectady, N. Y., assignor to General Electric Company, a corporation of New York Application October 21, 1947, Serial No. 781,055

10 Claims. (Cl. 250—232)

This invention relates to a motion transmitting device, and more particularly to such a device, the utilization of which does not require electrical or mechanical coupling to reproduce such motion.

It is an object of the present invention to provide a device of the type above described which does not require mechanical coupling, electrical coupling, or a combination of both, to reproduce the motion of a component coupled thereto at a remote point.

Another object is to provide a device which can reproduce the motion of a component coupled thereto at a remote point without the introduction of substantially any friction between said device and the moving component coupled thereto.

The above and other objects which are believed to be novel will be pointed out in the claims appended hereto.

In carrying out the present invention there is provided a source light which may be modulated, for example, to pulsate in intensity at a low frequency of the order of sixty cycles per second. Said modulated light is then directed through a polarizing arrangement coupled to the device, the motion of which it is desired to reproduce. The polarizing arrangement will sinusoidally alter the amount of transmitted light in accordance with the motion imparted to said polarizing means; in other words, the polarizing arrangement attenuates the light by varying amounts responsive to the motion transmitted.

The light passing through the polarizing means is directed toward a light sensitive arrangement, for example, a plurality of photoelectric cells in co-operative arrangement with said polarizing means. The light thus impinging on the photoelectric cells regulates the amount of electric current flowing through the cells which, in turn, is suitably amplified. The amplified currents are conducted through a suitable electric network to a receiver which is adapted to respond and reproduce the motion of the component actuating the polarizing means. Since there is neither electrical nor mechanical coupling between the component producing the motion and the device reproducing said motion, neither torque nor friction is developed and no energy will be given up by the motion-producing component to the reproducing system.

Although, by way of illustration, the means for altering the amount of light is described as a polarizing arrangement, any other suitable means capable of altering the intensity of the light sinusoidally in accordance with the motion of the component coupled to said means may be used. For example, a member having a rectangular aperture through which the light passes may have disposed between it and the light an eccentrically pivoted, substantially circular member driven by said motion-producing component. The amount of light passing through the aperture will depend on the position, at any instant, of the revolving eccentric member. As the eccentric member revolves, it cuts off more or less light impinging on the photoelectric cells in response to the motion imparted to it by the actuating means coupled thereto. Also, instead of modulating the light, such modulation may be introduced in the amplifying stages.

For a better understanding of the present invention, reference is made in the following description to the accompanying drawing in which Fig. 1 is a partially pictorial and partially diagrammatic representation of a preferred embodiment of the present invention; Figs. 2, 3 and 4 are waveforms which may be present, under certain circumstances, in different portions of the circuit illustrated in Fig. 1, and Fig. 5 is an alternative arrangement for controlling the magnitude or intensity of a light source.

Referring now more particularly to Fig. 1, there is shown a rotating member 10 adapted to be actuated by an electric motor 11, or other suitable means. To reproduce the motion of said member 10 without substantially any friction or torque, there is provided, in this particular embodiment, a rotatable light polarizing disk 12, the periphery of which is in contact with the plane surface of said motion producing member 10. Although the disk 12 is shown as being driven directly by the member 10 for the sake of simplifying the description, other means may be resorted to for driving the disk 12 to impart thereto motion in accordance with the rotation of the member 10. It should be borne in mind that whatever means are utilized to drive the disk 12, the disk itself can be suitably supported or journalled so as to develop a minimum of friction.

In order to transmit the motion of the member 10 to a point remote from the location thereof, a Selsyn-like transmitting arrangement is provided as follows. Disposed on one side of the polaroid disk are a plurality of mirrors 13, 14 and 15 in co-operative arrangement with a source of light 16. The mirrors are so disposed as to direct the reflected light beams in the direction of the light polarizing disk 12. The light source is suitably modulated, for example, at a frequency of the order of sixty cycles per second and is directed by the mirrors so as to pass through the disk 12 normal to its plane surface. On the opposite side of the rotatable light polarizing disk 12 are a plurality of fixed light polarizing disks 17, 18 and 19, the planes of polarization of which are permanently fixed at angles of 60 and 120 degrees to each other, respectively. The light beams coming through the fixed disks 17, 18 and 19 are directed toward a plurality of co-operating light-sensitive devices such as photoelectric cells 20, 21 and 22. The light beams thus impinging on the photoelectric cells control the amount of alternating currents flowing therethrough, said currents being amplified by a plurality of co-operating amplifiers 23, 24 and 25. While the preferred embodiment utilizes modulated light, the modulation component may be impressed across the input of the amplifiers 23–25.

Regressing for the moment, it will be noted that the output voltages of each of three windings of a Selsyn transmitter or generator may be expressed by the equations:

(1) $\quad e_1 = a \cos wt \cos pt$
(2) $\quad e_2 = a \cos wt \cos (pt + 2\pi/3)$
(3) $\quad e_3 = a \cos wt \cos (pt + 4\pi/3)$ where $pt$ is the angle of rotation of the armature and $w/2\pi$ is the input frequency, $a$ being a constant.

Referring again to Fig. 1, if the light source 16 be modulated at a frequency of $w/2\pi$ and passed through the light polarizing disk 12 the stationary disk 19, the photocell 22 and the amplifier stage 25, the alternating current output of the amplifier stage 25 may be represented by the equation:

$$E = a' \cos wt \,(1 + \cos 2\,p't)$$

where $a'$ is a constant and $p't$ is the angle of rotation of the polarizer disk 12. By subtracting ($a' \cos wt$) from this equation, one gets:

$$E = a' \cos wt \cos 2\,p't$$

This last-mentioned equation is similar to Equation 1 above. By passing two more light beams through the rotating light polarizing disk 12 and then the three beams through the stationary disks 17–19, the planes of polarization of which are permanently fixed and at angles of 60 and 120 degrees to each other, respectively, and amplifying the photoelectric output of each, then subtracting a voltage from each, equal to ($a' \cos wt$) one obtains the following equations:

(4) $\quad a' \cos wt \cos 2\,p't$
(5) $\quad a' \cos wt \cos (2\,p't + 2\pi/3)$
(6) $\quad a' \cos wt \cos (2\,p't + 4\pi/3)$ All other things being equal, $pt = 2\,p't$.

The outputs of the amplifiers 23–25 are connected to a Selsyn receiver or so-called Selsyn motor 26. The Selsyn motor or receiver 26 comprises a stator 27 having three windings 28, 29 and 30 and a rotor 31 having a single phase winding 32. The winding 32 is connected, in phase with a primary winding 33 of a transformer 34, to an alternating current circuit 35. The secondary of the transformer 34 comprises three windings 36, 37 and 38 and these are connected, respectively, between the amplifiers 23–25 and the stator windings 28–30. As the polarizer disk 12 turns, the Selsyn receiver 26 will turn in response but at twice the angle that the polarizer disk turns. This is due to the fact that the rotating disk 12 will produce in combination with the other disks 17–19 a maximum and minimum light intensity twice during the complete rotation of the disk 12 through 360 degrees.

Generally, in the operation of a motion transmitting system utilizing a Selsyn transmitter and receiver, the rotation of the rotor of the transmitter will induce in the stator windings thereof different values of voltage, depending on the relation of the magnetic axis of the rotor to the individual windings of the stator. These different values of voltage are conducted to the stator windings of the receiver and will cause the magnetic axis of the rotor thereof to align itself with respect to the field of its stator windings in accordance with said voltages. The rotor of the receiver thus transforms this stator field motion into mechanical motion which is in synchronism with the mechanical motion of the rotor of the transmitter and in phase relation with respect to the source of current energizing the windings of the two rotors.

In the embodiment of this invention, the winding 33 functions with the rotor winding 32 to maintain an in-phase relation between the receiver 26 and the transmitter represented by the transformer 34 and all of the components connected thereto. The winding 33, being stationary, cannot function as a rotor. However, different voltage values are transmitted to the stator windings 28–30 from the output of the amplifiers 23–25 and the windings 36–38 and produce the same effect as would the rotor of a Selsyn transmitter in the transmitting portion of the system. These voltages (Equations 4, 5, and 6), having different values in accordance with the rotation of the light polarizing disk 12, as previously described, will cause the magnetic axis of the rotor winding 32 to align itself in accordance with the voltages present in the stator windings 28–30, although the angular motion of the rotor 26 will be twice that of the rotating disk 12, as previously explained.

Fig. 2 represents the waveform of the voltage appearing at the input circuit 25' of the amplifier 25 when modulated by the rotation of the polaroid disk 12. The frequency of the varying voltage, as represented by the wave 40, is the alternations of current through the photoelectric cell 22 as produced by the frequency of the light 16. In Fig. 3 the waveform represents the voltage appearing across the secondary winding 38 and its frequency, although the same as the frequency of the light 16, is 180 degrees out of phase therewith. The algebraic sum of the waveforms of Figs. 2 and 3 is shown in Fig. 4. This last-mentioned voltage appears across one side 25'' of the amplifier 25 and one end 38' of the winding 38.

The above-described waveforms pertain to one portion of the transmitting circuit and represents the result of the rotation of the disk 12 through 180 degrees. It will be observed that the waveform of Fig. 2 does not reverse when it reaches the minimum magnitude or point 41 but continues in the same phase sense in the second portion 42. The application of a voltage of this waveform to the Selsyn receiver 26 would not operate receiver 26. However, the production of a voltage having the waveform of Fig. 4 is suitable for Selsyn operation since it reverses its phase every 180 degrees, as evidenced by the points 43, 44 and 45. It will also be noted that within the range of 180 degrees of the waveform 40, the modulation of the waveform of Fig. 4 is twice that of Fig. 2 as previously explained.

In Fig. 5 is illustrated an alternative method of controlling the amount of light incident on the photoelectric cells 20—22. This arrangement comprises a plurality of mirrors 50, 51 and 52 suitably supported at an angle with respect to the light 16 so as to reflect the light in the direction of the photoelectric cells 20—22. Disposed between the mirrors 50, 51 and 52 is an eccentrically pivoted disk 53. The disk 53 may be composed of any opaque material and is suitably fashioned to provide a sinusoidal variation of the reflected light from the mirrors 50—52 as it intercepts the light directed toward the photoelectric cells 20—22. A plurality of lenses 54, 55 and 56 are disposed between the rotating disk 53 and the photoelectric cells 20—22 in cooperative relation with respect to the mirrors 50—52. These lenses serve to intercept the light reflected from the mirrors and direct same, as substantially parallel beams, toward the photoelectric cells. The disk 53 may be actuated by a second disk (not shown). Such a disk can be attached to a shaft 57 which is affixed to the eccentric disk 53 and driven in the same manner as disk 12. The operation of the above described arrangement for controlling the amount of light proceeds along the same lines as the polaroid disk control above described except that one complete rotation of the eccentric disk 53 produces one revolution at the receiving or reproducing device 26.

The embodiments of the present invention which have been illustrated and described have been selected for the purpose of setting forth the principles involved. It will be obvious that the invention may be modified to meet various conditions in different specific uses and it is, therefore, intended to cover by the appended claims all such modifications which fall within the spirit and scope of the present invention.

What I claim as new and desire to secure by Letters Patent of the United States is:

1. A motion transmitting system having motion producing and reproducing means comprising, a source of light, means for intercepting said light to produce a plurality of light beams, means for sinusoidally varying said light beams in response to said motion producing means, a plurality of light-sensitive means responsive to said sinusoidally varying light beams, amplifying means coupled to said light-sensitive means for amplifying the current variations therethrough, an alternating current circuit, means for connecting the output of said alternating current circuit to the output of said amplifying means for producing a potential capable of reversing its phase periodically, and means for connecting said periodic phase-reversing potential to said motion reproducing means.

2. A motion transmitting system having motion producing and reproducing means comprising, a source of light, means for intercepting said light to produce a plurality of light beams, means for sinusoidally varying said light beams in response to said motion producing means, a plurality of light-sensitive means the current through which varies in response to said sinusoidally varying light beams, amplifying means coupled to said light-sensitive means for amplifying the current variations therethrough, an alternating current circuit, means for connecting the output of said alternating current circuit to the output of said amplifying means for producing a potential capable of reversing its phase periodically, and means for connecting said periodic phase-reversing potential to said motion reproducing means.

3. A motion transmitting system having motion producing and reproducing means comprising, a source of modulated light, means for intercepting said light to produce a plurality of light beams, rotatable light polarizing means coupled to said motion producing means and adapted to intercept said light beams for sinusoidally varying the amount thereof in response to said motion producing means, a plurality of light-sensitive means responsive to said varying light beams, amplifying means coupled to said light-sensitive means for amplifying the variations thereof, an alternating current circuit, means for connecting the output of said alternating current circuit to the output of said amplifying means for producing a potential capable of reversing its phase periodically, and means for connecting said periodic phase-reversing potential to said motion reproducing means.

4. A motion transmitting system having motion producing and reproducing means comprising, a source of modulated light, rotatable light polarizing means coupled to said motion producing means, reflecting means adapted to reflect said light in the direction of said rotatable light polarizing means, relatively fixed light polarizing means adapted to intercept the polarized light passing through said rotatable light polarizing means for sinusoidally varying the amount of light passing through said fixed light polarizing means, a plurality of light-sensitive means adapted to respond to said varying light, amplifying means coupled to said light-sensitive means for amplifying the variations thereof, an alternating current circuit, means for connecting the output of said alternating current circuit to the output of said amplifying means for producing a potential capable of reversing its phase periodically, and means for connecting said periodic phase-reversing potential to said motion reproducing means.

5. A motion transmitting system having motion producing and reproducing means comprising, a source of modulated light, means for converting said light to produce a plurality of light beams, an eccentrically pivoted shutter adapted to be actuated by said motion producing means and being disposed so as to intercept said light beams for sinusoidally varying same in response to said motion producing means, a plurality of light-sensitive means the current through which varies in response to said sinusoidally varying light beams, amplifying means coupled to said light-sensitive means for amplifying the current variations therethrough, an alternating current circuit, means for connecting the output of said alternating current circuit to the output of said amplifying means for producing a potential capable of reversing its phase periodically, and means for connecting said periodic phase-reversing potential to said motion reproducing means.

6. In a photoelectric motion transmitting device, the combination of means to provide at least three light beams pulsating in intensity at a predetermined frequency, means to attenuate these light beams by amounts having relative variations responsive to the motion transmitted, motion reproducing means operative in response to at least three electric currents of the same frequency as said light pulsations but 180 degrees different in phase, and a plurality of photoelectric means to vary the amplitudes of said electric currents responsive to variations in the attenuation of respective ones of such light beams.

7. In a photoelectric motion transmitting device, the combination of a light-polarizing disk, means to rotate said disk responsive to the motion transmitted, means to direct three light beams through said disk pulsating in intensity at a predetermined frequency, three additional polarizing elements respectively positioned in the paths of the three light beams and having their directions of polarization 60 degrees apart, so that the light beams are attenuated by amounts having relative variations as the polarizing disk rotates responsive to the motion transmitted, motion reproducing means operative in response to three electric currents of the same frequency as said light pulsations but 180 degrees different in phase, and a plurality of photoelectric means to vary the amplitudes of said electric currents responsive to variations in the attenuation of respective ones of such light beams.

8. In a photoelectric motion transmitting device, the combination of an opaque disk rotatable about an eccentric axis, means to rotate said disk responsive to the motion transmitted, means to direct three light beams pulsating in intensity along respective paths 120 degrees apart around the axis of said disk, so that the disk intercepts and attenuates the three beams by amounts having relative variations as the disk rotates responsive to the motion transmitted, motion reproducing means operative in response to three electric currents of the same frequency as said light pulsations but 180 degrees different in phase, and a plurality of photoelectric means to vary the amplitudes of said electric currents responsive to variations in the attenuation of respective ones of such light beams.

9. A photoelectric motion transmitter comprising means to provide a plurality of light beams, means to attenuate these light beams by amounts having relative variations responsive to the motion transmitted, a plurality of photoelectric means to vary the amplitudes of electric currents responsive to variations in the attenuation of respective ones of such currents, and means to add to each such current a constant-amplitude current having the same frequency but 180 degrees different in phase.

10. A photoelectric motion transmitter comprising means to provide a plurality of pulsating light beams, means to attenuate these light beams by amounts having relative variations responsive to the motion transmitted, a plurality of photoelectric means to provide attenuating electric currents having a frequency determined by the light beam pulsations and having relative amplitudes determined by the relative attenuations of the light beams, and means to add to each such current a constant-amplitude current having the same frequency but 180 degrees different in phase.

THEODORE M. BERRY.

REFERENCES CITED

The following references are of record in the file of this patent:

UNITED STATES PATENTS

| Number | Name | Date |
|---|---|---|
| 1,957,236 | Stewart | May 1, 1934 |
| 2,140,368 | Lyle | Dec. 13, 1938 |
| 2,167,484 | Berry | July 25, 1939 |

Certificate of Correction

Patent No. 2,503,023 — April 4, 1950

THEODORE M. BERRY

It is hereby certified that error appears in the printed specification of the above numbered patent requiring correction as follows:

Column 3, line 26, for that portion of the equation reading "$pt=2\pi/3$" read $pt+2\pi/3$;

and that the said Letters Patent should be read with this correction therein that the same may conform to the record of the case in the Patent Office.

Signed and sealed this 26th day of September, A. D. 1950.

[SEAL]

- THOMAS F. MURPHY,
*Assistant Commissioner of Patents.*